(12) United States Patent
Grayson et al.

(10) Patent No.: US 9,260,205 B2
(45) Date of Patent: Feb. 16, 2016

(54) ANTIVORTEX DEVICE FOR MULTI-OUTLET LIQUID RESERVOIR

(71) Applicant: The Boeing Company, Seal Beach, CA (US)

(72) Inventors: Gary David Grayson, Huntington Beach, CA (US); Stephen Michael Addison, Huntsville, AL (US)

(73) Assignee: The Boeing Company, Chicago, IL (US)

(*) Notice: Subject to any disclaimer, the term of this patent is extended or adjusted under 35 U.S.C. 154(b) by 357 days.

(21) Appl. No.: 13/741,526

(22) Filed: Jan. 15, 2013

(65) Prior Publication Data

US 2014/0196790 A1    Jul. 17, 2014

(51) Int. Cl.
  *F16L 41/00* (2006.01)
  *B64G 1/40* (2006.01)
  *F02K 9/60* (2006.01)

(52) U.S. Cl.
  CPC ............... *B64G 1/402* (2013.01); *F02K 9/605* (2013.01); *Y10T 137/0318* (2015.04); *Y10T 137/86348* (2015.04)

(58) Field of Classification Search
  CPC .................................. B64G 1/402; F02K 9/60
  USPC ...................... 137/590, 551, 561 A, 255, 574; 244/172.2
  See application file for complete search history.

(56) References Cited

U.S. PATENT DOCUMENTS

| 4,467,985 | A | 8/1984 | Salvatore |
| 4,898,030 | A * | 2/1990 | Yeh .............................. 73/290 V |
| 6,014,987 | A | 1/2000 | List et al. |
| 6,113,032 | A | 9/2000 | Cochran et al. |
| 6,220,287 | B1 | 4/2001 | Wolf |
| 6,591,867 | B2 | 7/2003 | Grayson |
| 6,840,275 | B2 | 1/2005 | Grayson |
| 2003/0005708 | A1 | 1/2003 | Beck et al. |
| 2003/0056838 | A1 | 3/2003 | Grayson |
| 2012/0080112 | A1 * | 4/2012 | Van Haaren et al. ........... 138/39 |

OTHER PUBLICATIONS

International Search Report and Written Opinion of international application No. PCT/US2013/073963; Apr. 14, 2014; 10 pages.
International Search Report and Written Opinion of international application No. PCT/US2013/073963; Jul. 21, 2015; pp. 5.

* cited by examiner

*Primary Examiner* — Craig Schneider
*Assistant Examiner* — Angelisa L Hicks
(74) *Attorney, Agent, or Firm* — Armstrong Teasdale LLP

(57) ABSTRACT

A liquid reservoir with a sump includes at least two outlet ports in fluid communication with a fluid conduit. An anti-vortex device includes a first plate extending across the at least two outlet ports and a second plate coupled to the first plate and extending substantially perpendicular to the first plate. The anti-vortex device is configured to disrupt formation of a vortex formed by liquid passing from the reservoir through said outlet ports.

20 Claims, 5 Drawing Sheets

ANTIVORTEX DEVICE FOR MULTI-OUTLET LIQUID RESERVOIR

STATEMENT REGARDING FEDERALLY SPONSORED RESEARCH & DEVELOPMENT

The invention described herein was made in the performance of work under NASA Contract No. NNM07AB03C and is subject to the provisions of Section 305 of the National Aeronautics and Space Act of 1958 (72 Stat.435: 42 U.S.C. 2457).

FIELD

The field of the disclosure relates generally to anti-vortex and vapor-ingestion-suppression devices, and more particularly, to anti-vortex and vapor-ingestion-suppression devices for liquid reservoirs including multiple liquid outlet ports.

BACKGROUND

Launch vehicles, such as rocket engine propelled vehicles intended for space travel, typically use a liquid propellant that is stored in a storage tank and supplied to engines during takeoff and flight. When the liquid propellant is supplied to the engines, vapor or gases cannot be allowed to enter the engines in large amounts. If vapor or gas is introduced into the engines in sufficient quantities, the gas ingestion may cause a stall or other malfunctioning of the engine that may increase the possibility of engine failure. Additionally, it may be desirable to empty the liquid storage tanks as completely as possible through engine combustion to maximize engine operating time, which may allow for increased vehicle payload.

For example, with reference to FIGS. 1-3, a liquid tank 100 is shown containing a liquid 102 therein. The tank 100 of FIGS. 1-3 does not include an anti-vortex device. An outlet port 104 is positioned at the bottom of the tank to facilitate outflow of the liquid 102. As shown in FIG. 2, as liquid 102 flows through the outlet port 104 and conduit 110, a dip 106 forms in the upper surface 108 of the liquid 102. The dip 106 is formed by inertial forces created by the liquid 102 draining from the tank 100. Due to the formation of dip 106, gas or vapor may be ingested into outlet port 104 at sump 112 and moved through conduit 110, where it is subsequently supplied to an engine (not shown). The dip 106 may increase in size due to a vortex motion of the liquid 102 as it exits through outlet port 104, which also increases the likelihood that gas will be ingested through the outlet port 104.

When there is sufficient liquid 102 in tank 100, as illustrated in FIG. 1, dip 106 may not be present. However, as the liquid 102 drains from tank 100, the dip 106 begins to form as illustrated in FIG. 2. The bottom of dip 106 grows ever closer to outlet port 104 as the liquid 102 drains from tank 100. Finally, as shown in FIG. 3, the dip 106 enters outlet port 104 and may even enter conduit 110, which causes gas to be ingested therethrough. As gas is ingested into the engine (rather than liquid 102), the engine may stall or become damaged.

One known attempt to reduce vapor ingestion uses a screen that encompasses the substantially all of the interior area of the liquid storage tank or at least a portion thereof. In this system, fluid is wicked through the screens by capillary action, and vapor or gas bubbles are prevented from flowing through the screens due to the bubble point pressure of the fluid screen system. However, such screen systems are typically only for storage tanks being used in low gravity and are less useful in environments where higher gravity is present. Additionally, the screen systems typically cannot be used with some liquid propellants such as hydrogen peroxide ($H_2O_2$) due to material incompatibility between $H_2O_2$ and typical screen materials, for example because the increased surface area of the screens adds more area for chemical reactions causing the liquid propellant to decompose.

Other systems may include vanes extending a distance from a sump of the tank towards the walls of the storage tank. These vanes help bring liquid propellants to the outflow area of the storage tank through capillary action. Furthermore, the vanes may reduce the ingestion of gas bubbles into the engine of the vehicle. The vanes used in known vapor-ingestion-suppression systems are for low gravity applications and cannot provide substantial vapor ingestion suppression at the higher gravity conditions typical of launch vehicles.

A need exists for a device for rockets or launch vehicles under normal or high gravity that will allow for anti-vortexing of the liquid propellant as it leaves a multiple-outlet tank, and to maximize the draining of liquid propellant into the sump and outlets, thereby increasing the efficiency of the storage tanks and decreasing the possible ingestion of gases.

BRIEF DESCRIPTION

In one aspect, a liquid reservoir includes a sump including at least two outlet ports in fluid communication with a fluid conduit. An anti-vortex device is provided that includes a first plate extending across the at least two outlet ports and a second plate coupled to the first plate and extending substantially perpendicular to the first plate. The anti-vortex device is configured to disrupt formation of a vortex formed by liquid passing from the reservoir through said outlet ports.

In another aspect, an anti-vortex device for suppressing the formation of a vortex created by a liquid flowing through at least two outlet ports is disclosed. The device includes a first plate extending across each of the outlet ports. The first plate is substantially aligned with a central axis of each of the outlet ports. A second plate extends substantially perpendicular to the first plate, and a top plate is coupled to each of the first plate and the second plate.

In yet another aspect, a method of suppressing a vortex from being formed in a liquid exiting at least two outlet ports of a liquid reservoir includes positioning an anti-vortex device over the outlet ports. The anti-vortex device includes a first plate and a second plate substantially perpendicular to the first plate. The anti-vortex device is positioned such that the first plate extends across each of the outlet ports and is substantially aligned with a central axis of each outlet port.

BRIEF DESCRIPTION OF THE DRAWINGS

Unless otherwise indicated, like reference numerals in the figures refer to like components.

DETAILED DESCRIPTION

Figure 1:
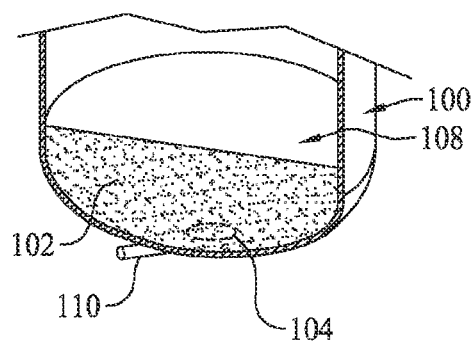
FIG. 1 is a section view of a tank including a volume of liquid.
Figure 2:
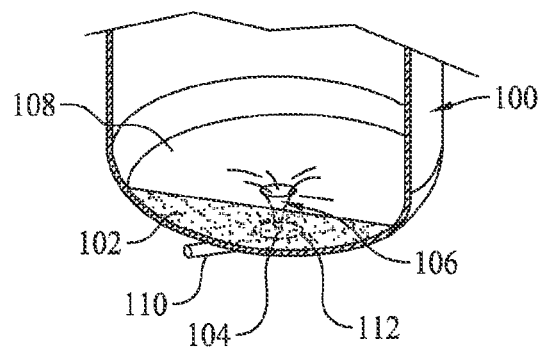
FIGS. 2-3 are section views of the tank of FIG. 1, showing the volume of liquid being dispensed from the tank.
Figure 3:
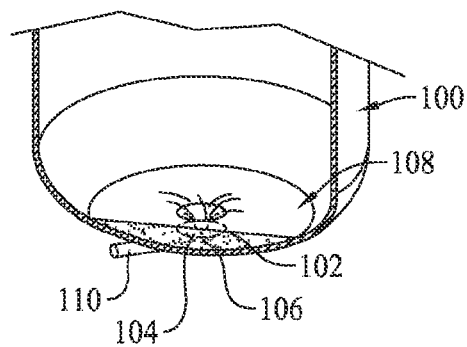
Figure 4:
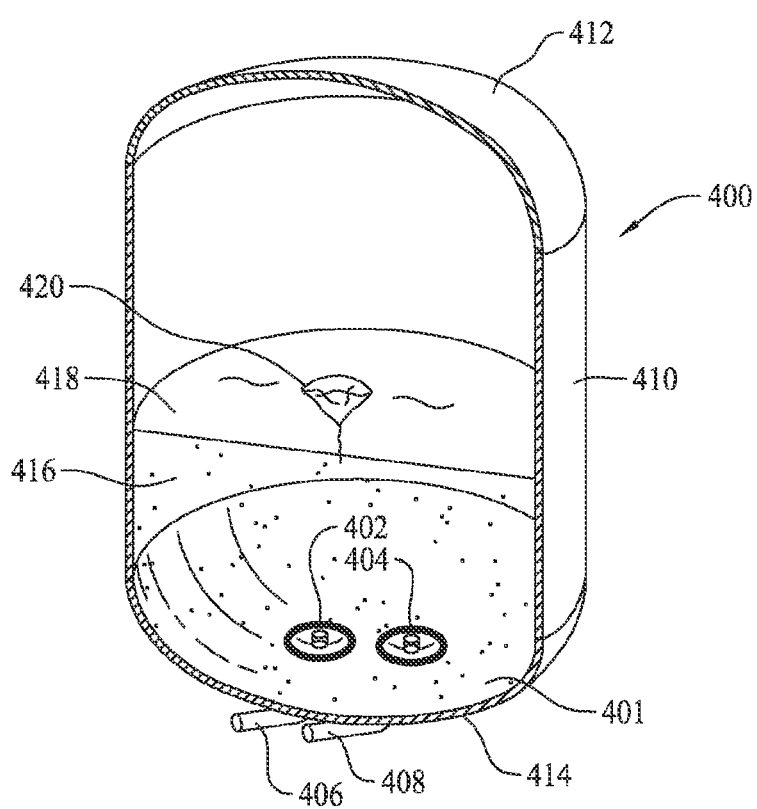
FIG. 4 is a section view of a multiple outlet reservoir of an implementation.

FIG. 4 illustrates an exemplary liquid reservoir 400 including a sump 401 having outlet ports 402 and 404. The outlet ports 402 and 404 are in fluid communication, respectively, with fluid conduits 406 and 408. In one implementation, the fluid conduits 406 and 408 are configured to supply liquid to an engine of a launch vehicle (not shown). Each of the fluid conduits 406 and 408 extend from the reservoir 400, and may be in communication with a manifold or other flow control device, such as a valve or pressure regulator or the like.

In the exemplary implementation, the liquid reservoir 400 has generally a cylindrical wall 410, a top dome 412 and a bottom 414 defining the sump 401. Although, liquid reservoir 400 is shown as a generally cylindrical tank, liquid reservoir may be any suitable shape for the intended application. The liquid reservoir 400 is configured to contain a liquid 416 therein. In the exemplary implementation, liquid 416 is a liquid fuel, oxidizer, or propellant, such as liquid oxygen ($LO_2$), liquid hydrogen ($LH_2$), hydrogen peroxide ($H_2O_2$), kerosene, gasoline, other hydrocarbons, combinations thereof, or the like. However, any suitable liquid may be contained therein. In some implementations, reservoir 400 is internally pressurized relative to the outside atmosphere. As such, the pressure may help to ensure that the liquid 416 exits the reservoir 400 through outlet ports 402, 404 as intended.

Figure 5:
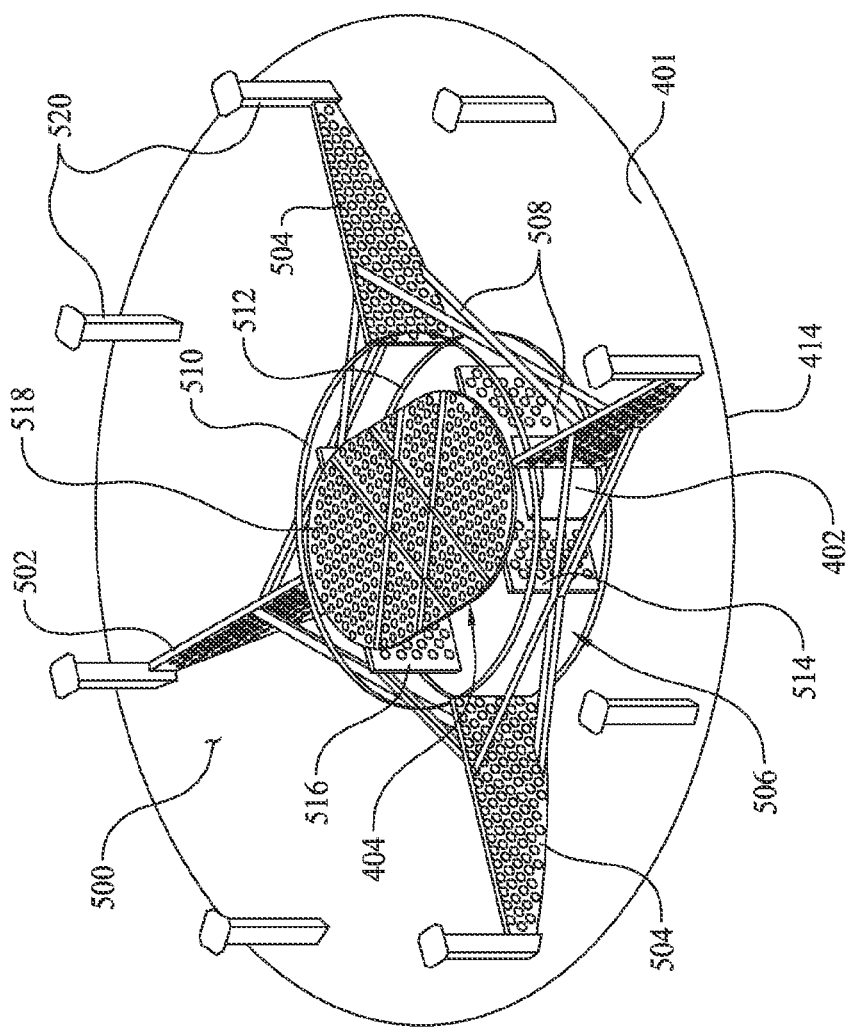
FIG. 5 is a perspective view of an anti-vortex device of an implementation.

Referring now to FIG. 5, sump 401 of reservoir 400 (FIG. 4) is shown including an implementation of an anti-vortex device 500. The anti-vortex device 500 includes a first plate 502 and a second plate 504 that extends substantially perpendicular to first plate 502. As shown, second plate 504 is formed as two separate pieces, but in other implementations, the second plate 504 may be formed as a single integral component. The first plate 502 spans across the bottom 414 of the reservoir 400, and over each of the outlet ports 402 and 404. The first plate 502 may be positioned over the outlet ports 402 and 404 such that the first plate extends across a central axis of each of the outlet ports 402, 404. In the implementation shown in FIG. 5, the second plate 504 extends only partially across the bottom 414 of the reservoir 400, such that the second plate 504 does not occupy a central area 506 of the sump 401. As such, a gap is defined in a middle of the second plate 504 by the cutout.

In one implementation, a plurality of stringers 508 are coupled to each of the first plate 502 and the second plate 504 to increase the rigidity of the anti-vortex device 500. In the implementation shown in FIG. 5, the plurality of stringers 508 are oriented in a cross, or "X" pattern, and extend obliquely to each of the first plate 502 and the second plate 504. However, the stringers 508 may extend in any configuration, and in any number, that increases the rigidity of the anti-vortex device 500. In another implementation, a top ring 510 and a bottom ring 512 are coupled to the first plate 502 and the second plate 504 to increase the rigidity of the anti-vortex device 500. Although FIG. 5 shows the anti-vortex device 500 including each of stringers 508, the top ring 510 and bottom ring 512, not all are required to be used simultaneously. In some implementations the stringers 508, the top ring 510 and bottom ring 512 may be used in conjunction with one another or individually. As used herein, the term "coupled" encompasses any mode of fastening including mechanical fasteners, adhesives, bonding, welding combinations thereof, or the like.

Figure 6:
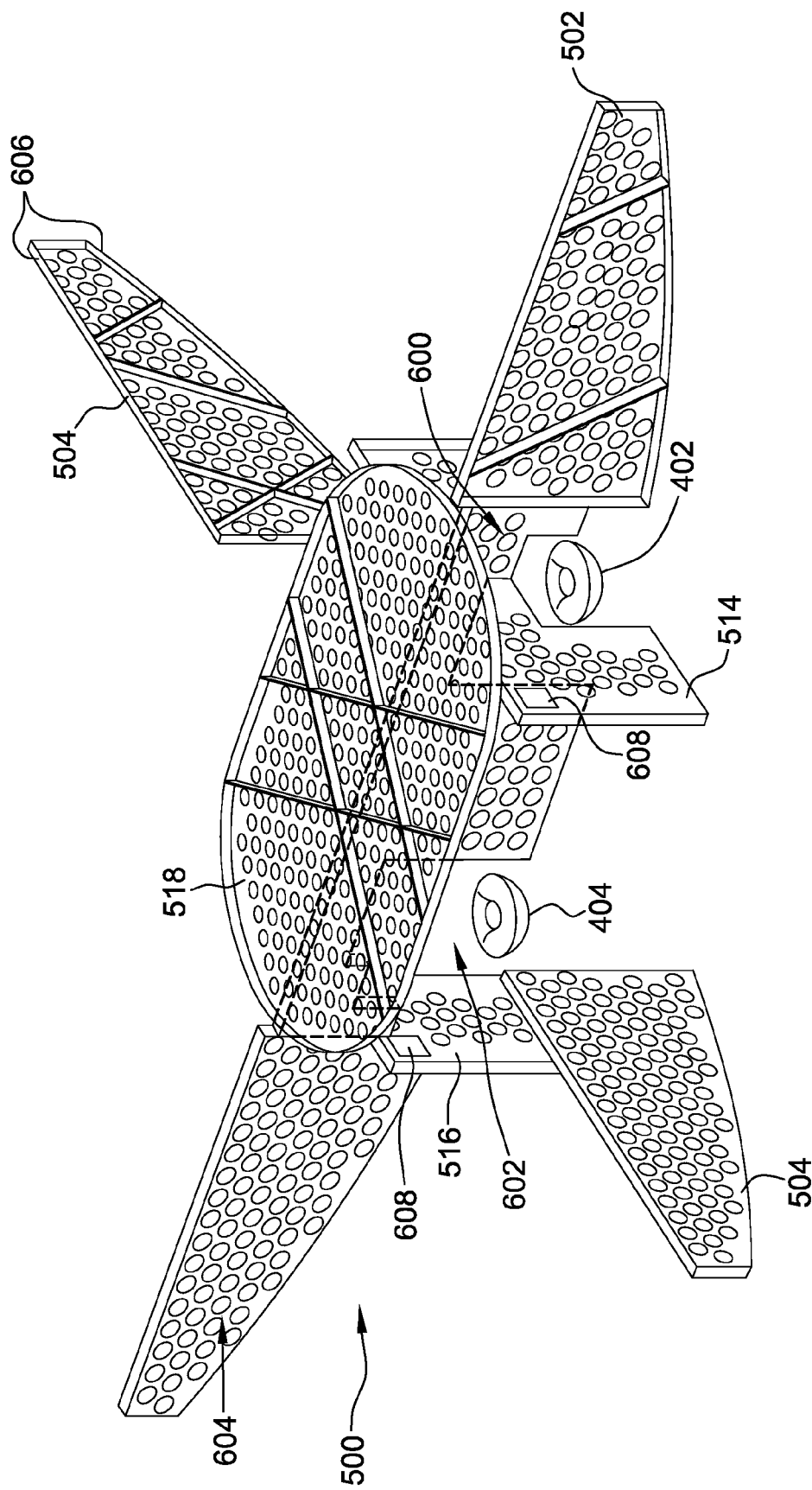
FIG. 6 is a detail view of an anti-vortex device of an implementation.

With reference to FIG. 6, each of the outlet ports 402 and 404 respectively have a transverse plate 514 and 516 that extends thereover. The transverse plates 514 and 516 extend substantially perpendicular to the first plate 502, and intersect with the first plate 502 substantially over the central axis of the respective outlet port 402, 404. As such, the first plate 502 together with the transverse plates 514 and 516 forms a double cruciform shape. In one implementation, each of the transverse plates 514 and 516 include a cutout section 600 and 602 (shown in FIG. 6), respectively, centered over the outlet ports 402 and 404. The cutout sections 600 and 602 may allow for improved liquid flow through outlet ports 402 and 404. In some embodiments, a filter screen (e.g., a cylindrical filter screen) (not shown), may be positioned in one or more of the cutout sections 600 and 602 to reduce contaminants entering the fluid conduits 406 and 408.

In yet another implementation, a top plate 518 extends over the central portion 506 of the sump and is coupled to the first plate 502 and the second plate 504 at an upper edge of the first and second plates. In one implementation, the top plate of the exemplary implementation is a substantially oval shape, and may be configured to increase the rigidity of the anti-vortex device 500. However, the top plate 518 may be any shape that allows the anti-vortex device to function as described herein.

In some implementations, one or more of the first plate 502, second plate 504, transverse plates 514, 516 and top plate 518 include a plurality of perforations, shown as open holes generally at 604 of FIG. 6. The perforations may be formed by any suitable method, such as drilling, punching, cutting, casting, molding or the like. One or more of the first plate 502, second plate 504, transverse plates 514, 516 and top plate 518 may be perforated to an extent that the porosity of the respective component is about 20% to about 40% porous. Such perforations facilitate frictional energy dissipation of the vortex and may reduce the weight and increase the liquid flow through the components. Although the perforations are shown to be circular, any shape of perforations may be used that allow the anti-vortex device to function as described herein.

In some implementations, one or more of the first plate 502, second plate 504 and transverse plates 514, 516 may be fabricated as a substantially flat plate. In other implementations, the upper and/or lower edges of such components may be formed with a bent tab 606 to increase the rigidity thereof. Further, referring again to FIG. 5, one or more of the first plate 502, second plate 504 and transverse plates 514, 516 may be fabricated such that a lower surface thereof is shaped to match the contour of the bottom 414 of the reservoir 400.

In yet other implementations, a plurality of posts 520 may be positioned annularly about the bottom 414 of the reservoir 400 to support one or more annular slosh baffles (not shown). In this implementation, at least one of first plate 502 and second plate 504 may be coupled to posts 520 to increase the structural rigidity of the anti-vortex device 500.

In use, the anti-vortex device 500 may perform several functions. For example, each of the first plate 502, second plate 504 and transverse plates 514, 516 decrease the kinetic energy of a swirling vortex flow of liquid 416 thereby reducing the surface dip 420 and reducing the possibility of gas ingestion into outlet ports 402 and 404. Without being held to a particular theory, it may be understood that such vortex flows are created by the motion of a vehicle containing (or coupled to) the reservoir 400, and from asymmetric features in the tank (not shown) or motion of the vehicle that facilitate a biased direction for liquid flow. Thus, due to the positioning of the anti-vortex device 500, the vortex is forced to flow through the perforations 604 of the first plate 502, second plate 504, transverse plates 514, 516 and top plate 518, which may cause the vortex to lose energy to the anti-vortex device by way of friction. Thus, the exemplary anti-vortex device 500 may reduce, eliminate or delay formation of a vortex, and thus reduce, eliminate or delay the ingestion of gas into the outlet ports 402 and 404.

In implementations including top plate 518, the top surface 418, which defines the liquid/gas interface, moves downward and through the top plate 518 as the liquid 416 drains from the reservoir 400. Without being bound to a particular theory, the interaction of the top surface 418 with the top plate 518 disturbs the dip 420 and destabilizes the dip 420, which may reduce, eliminate or delay the formation of the vortex and gas ingestion into the outlet ports 402 and 404.

In some implementations, the anti-vortex device 500 may perform a slosh suppression function. For example, each of the first plate 502, second plate 504 and transverse plates 514, 516 may be configured to suppress or dampen lateral and transversely moving flows of liquid 416 within reservoir 400. For example, without being bound to a particular theory, as the moving flow interacts with one or more of the first plate 502, second plate 504 and transverse plates 514, 516 the flows energy is reduced by friction, and is destabilized by such interaction.

In implementations wherein liquid 416 is a cryogenic liquid, the top plate 518 may be configured to diffuse an upward geyser of boiling liquid 416 that may shoot out of the outlet ports 402 and 404 into the reservoir 400. In such implementations, as the geyser interacts with the top plate 518, the top plate diffuses the liquid 416, which may reduce or eliminate possible damage otherwise caused by such geysers.

In some implementations, one or more liquid level sensors 608 may be positioned about the anti-vortex device. For example, in the implementation of FIG. 6, the liquid level sensors 608 are coupled to the transverse plates 514 and 516. However, the liquid level sensors 608 may be positioned on any component of the anti-vortex device 400. The liquid level sensors 608 are configured to detect a level of the liquid 416 within the reservoir 400. The liquid level sensors 608 may output a signal to a control device, electronic control unit or other computer, based upon the liquid level detected within the reservoir 400. Based upon the output of the liquid level sensors 608, the control device may be configured to adjust (i.e., start, stop, increase, decrease or maintain) the rate of flow of liquid 416 flowing through outlet ports 402 and 404.

It is noted that one or more of the components of anti-vortex device 500 may be formed as a single piece, multiple pieces or integrally together. For example, each of the first plate 502, second plate 504 and transverse plates 514, 516 may each be formed as a single piece or multiple pieces. Alternatively, one or more of such components may be formed integrally with each other.

This written description uses examples to disclose the implementations, including the best mode, and also to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A liquid reservoir, comprising:
   a sump including at least two outlet ports in fluid communication with a fluid conduit, the at least two outlet ports defined in a surface of a central portion of the sump;
   an anti-vortex device including a first plate and a second plate each oriented generally perpendicular to the surface of the central portion, the first plate extending across the at least two outlet ports and the second plate coupled to the first plate and extending substantially perpendicular to the first plate, wherein the second plate comprises at least two co-planar segments defining a gap therebetween, the gap being oriented over the central portion;
   wherein the anti-vortex device is configured to disrupt formation of a vortex formed by liquid passing from the reservoir through said outlet ports.

2. The liquid reservoir according to claim 1, wherein the liquid reservoir is a tank for storing liquid propellant for a rocket.

3. The liquid reservoir according to claim 1, further comprising a top plate coupled to each of the first plate and the second plate.

4. The liquid reservoir according to claim 1, wherein the first plate is positioned over a central axis of each of the outlet ports.

5. The liquid reservoir according to claim 1, wherein each of the first plate and the second plate include a plurality of perforations such that each of the first plate and the second plate have a porosity of about 20% to about 40%.

6. The liquid reservoir according to claim 1, wherein the second plate is comprised of at least two segments that are each coupled to the first plate by at least one stringer.

7. The liquid reservoir according to claim 1, further comprising two transverse plates, each of the transverse plates oriented substantially perpendicular to the first plate and each being positioned over one of the outlet ports.

8. The liquid reservoir according to claim 1, wherein at least one of the first plate and the second plate are coupled to a support post.

9. The liquid reservoir according to claim 1, further comprising at least one liquid level sensor for determining a quantity of liquid in the reservoir.

10. The liquid reservoir according to claim 1, further comprising a support ring coupled to each of the first plate and the second plate, the support ring configured to increase the rigidity of the anti-vortex device.

11. An anti-vortex device for suppressing the formation of a vortex created by a liquid flowing through at least two outlet ports defined in a surface of a central portion of a sump, the device comprising:
    a first plate extending across each of the outlet ports, the first plate oriented generally perpendicular to the surface of the central portion and substantially aligned with a central axis of each outlet port,
    a second plate extending substantially perpendicular to the first plate, the second plate oriented generally perpendicular to the surface of the central portion, wherein the second plate comprises at least two co-planar segments defining a gap therebetween, the gap being oriented over the central portion, and
    a top plate coupled to each of the first plate and the second plate.

12. The anti-vortex device according to claim 11, wherein the first plate includes a first cut-out substantially centered over one of the outlet ports and a second cut-out substantially centered another of the outlet ports.

13. The anti-vortex device according to claim 11, wherein each of the first plate and the second plate are perforated to a porosity of about 20% to about 40%.

14. The anti-vortex device according to claim 11, further comprising a first transverse plate oriented substantially perpendicular to the first plate and extending across one of the outlet ports and a second transverse plate oriented substantially perpendicular to the first plate and extending across another of the outlet ports.

15. The anti-vortex device according to claim 11, further comprising a plurality of stringers coupled to the first plate and the second plate, the stringers configured to increase the rigidity of the anti-vortex device.

16. A method of suppressing a vortex from being formed in a liquid exiting at least two outlet ports defined in a surface of a central portion of a liquid reservoir, the method comprising:
   positioning an anti-vortex device over the outlet ports, the anti-vortex device including a first plate and a second plate each oriented generally perpendicular to the surface, the second plate substantially perpendicular to the first plate, wherein the second plate includes at least two co-planar segments defining a gap therebetween, the gap being oriented over the central portion,
   wherein the anti-vortex device is positioned such that the first plate extends across each of the outlet ports, and is substantially aligned with a central axis of each outlet port.

17. The method according to claim 16, further comprising coupling a top plate to the first plate and the second plate.

18. The method according to claim 16, further comprising coupling a plurality of stringers to the first plate and the second plate to increase the rigidity of the anti-vortex device.

19. The method according to claim 16, further comprising coupling a liquid level sensor to the anti-vortex device.

20. The method according to claim 16, further comprising positioning the first plate in the reservoirs such that a lower surface of the first plate corresponds to a contour of a sump of the liquid reservoir.

* * * * *